(12) United States Patent
Camilo et al.

(10) Patent No.: US 10,876,560 B2
(45) Date of Patent: Dec. 29, 2020

(54) CAMSHAFT PHASER INCLUDING ROTOR CONNECTOR

(71) Applicant: Schaeffler Technologies AG & Co. KG, Herzogenaurach (DE)

(72) Inventors: Alexandre Camilo, Rochester Hills, MI (US); Renato de Oliveira Ghiraldi, Madison Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/385,401

(22) Filed: Apr. 16, 2019

(65) Prior Publication Data

US 2020/0332816 A1 Oct. 22, 2020

(51) Int. Cl.
| | | |
|---|---|---|
| *F01L 1/34* | (2006.01) | |
| *F16B 7/02* | (2006.01) | |
| *F16D 1/10* | (2006.01) | |
| *F01L 1/344* | (2006.01) | |

(52) U.S. Cl.
CPC ............... *F16B 7/02* (2013.01); *F01L 1/344* (2013.01); *F16D 1/10* (2013.01)

(58) Field of Classification Search
CPC ............... F16B 7/02; F01L 1/344; F16D 1/10
See application file for complete search history.

(56) References Cited

U.S. PATENT DOCUMENTS

2014/0190434 A1* 7/2014 Bayrakdar ............ F01L 1/3442
123/90.17

* cited by examiner

*Primary Examiner* — Zelalem Eshete
(74) *Attorney, Agent, or Firm* — Davidson, Davidson & Kappel, LLC (57) ABSTRACT

A camshaft phaser includes a stator, a rotor rotatable with respect to the stator, and a connector configured for being nonrotatably fixed to the rotor. The connector is configured for being nonrotatably connected to an outer circumferential surface of a camshaft. A method of constructing a camshaft phaser for an internal combustion engine includes providing a stator and a rotor rotatable with respect to the stator; and providing a connector configured for nonrotatably fixing to the rotor, the connector being configured for being nonrotatably connected to an outer circumferential surface of a camshaft.

12 Claims, 6 Drawing Sheets

CAMSHAFT PHASER INCLUDING ROTOR CONNECTOR

The present disclosure relates generally to camshaft phasers and more specifically to rotors for camshaft phasers.

BACKGROUND

Rotors of camshaft phasers are conventionally connected to the camshaft by splines.

SUMMARY OF THE INVENTION

A camshaft phaser includes a stator, a rotor rotatable with respect to the stator, and a connector configured for being nonrotatably fixed to the rotor. The connector is configured for being nonrotatably connected to an outer circumferential surface of a camshaft.

In embodiments of the camshaft phaser, the rotor may include a recess extending axially from a radially extending surface of the rotor and the connector may be configured for being fixed in the recess. The connector may include an annular base and at least one fixing segment protruding radially outward from the annular base. The recess may include at least one slot and the at least one fixing segment may be configured for being fixed in the at least one slot. The at least one fixing segment may be a plurality of fixing segments and the at least one slot may be a plurality of slots. Each of the fixing segments may be configured for being fixed in a respective one of the plurality of slots. The connector may be configured for being nonrotatably fixed to the rotor via a press-fit interference. The connector may be configured for being nonrotatably connected to the outer circumferential surface of the camshaft via a press-fit interference. An inner diameter of the connector may greater than an inner diameter of the rotor. The camshaft phaser may further include a second rotor configured for nonrotatably connecting to a second camshaft. The second rotor may be axially offset from the rotor and may be rotatable with respect to the stator. The camshaft phaser may further include a second connector configured for being nonrotatably fixed to the second rotor. The second connector may be configured for being nonrotatably connected to an outer circumferential surface of a second camshaft A method of constructing a camshaft phaser for an internal combustion engine includes providing a stator and a rotor rotatable with respect to the stator; and providing a connector configured for nonrotatably fixing to the rotor, the connector being configured for being nonrotatably connected to an outer circumferential surface of a camshaft.

In embodiments of the method, the method may further include nonrotatably fixing the rotor to the connector. The rotor may include a recess extending axially from a radially extending surface of the rotor. The nonrotatably fixing of the rotor to the connector may include fixing the connector in the recess. The connector may include an annular base and at least one fixing segment protruding radially outward from the annular base. The recess may include at least one slot and the nonrotatably fixing of the rotor to the connector may include fixing the at least one fixing segment in the at least one slot. The nonrotatably fixing of the rotor to the connector may include fixing the rotor to the connector via a press-fit interference. The method may further include nonrotatably connecting the connector to the outer circumferential surface of the camshaft via a press-fit interference.

BRIEF DESCRIPTION OF THE DRAWINGS

The present invention is described below by reference to the following drawings, in which.

DETAILED DESCRIPTION

The present disclosure provides a less expensive arrangement for connecting a rotor of a camshaft phaser to a camshaft, in particular an outer camshaft of a double camshaft. Using splines to nonrotatably connect the rotor to the camshaft is expensive due to the spline manufacturing processes (e.g. broaching, hobbing, milling, shaping, etc.). The present disclosure provides an extra component, a connector for example in the form of a discus accessory, to connect the rotor to the camshaft without splines on the inner circumferential surface of the rotor and without splines on the outer circumferential surface of the camshaft. The discus accessory can be assembled with press-fit interference in the camshaft and the rotor can also be connected to the discus accessory with press-fit interference. Between the rotor and camshaft, clearance is designed in order to provide support for the bearing loads from the stator.

Figure 1:
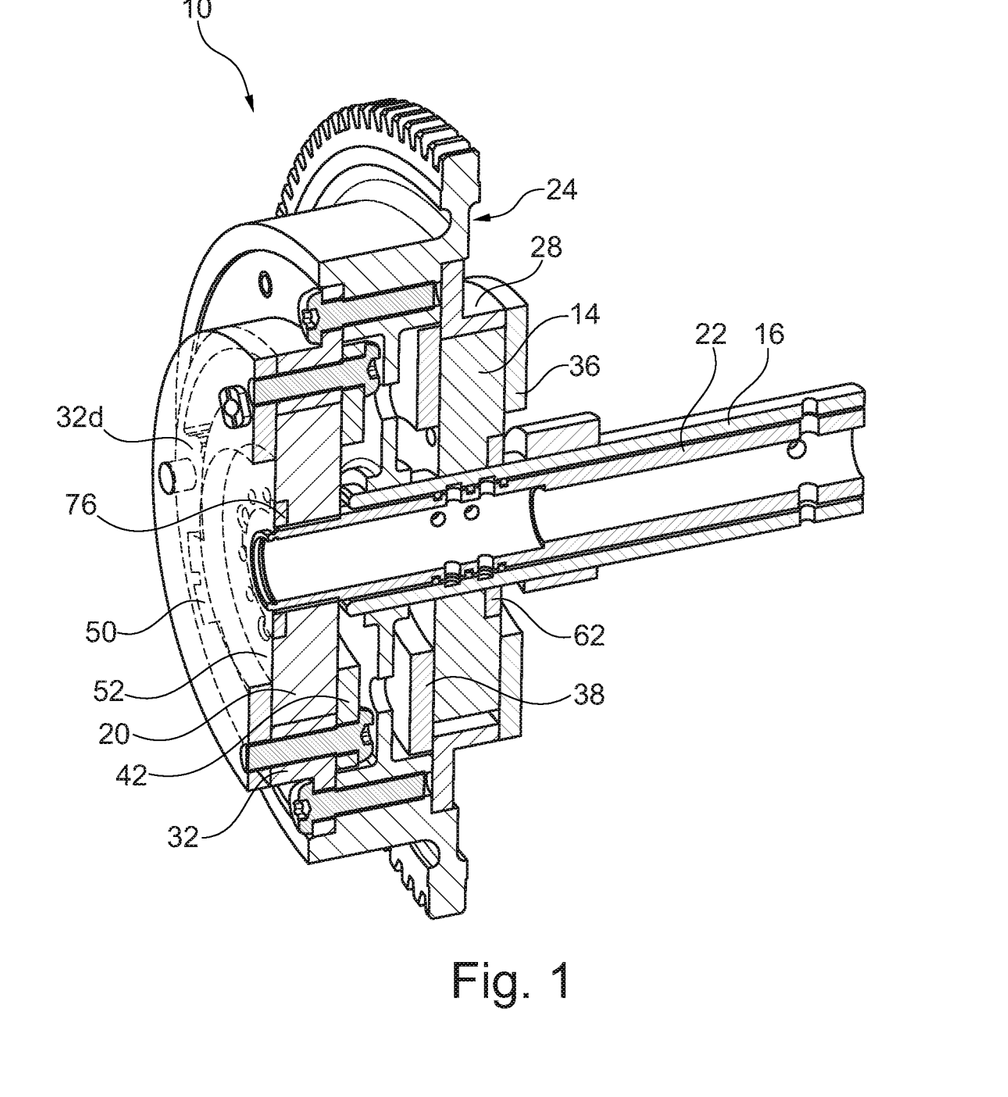
FIGS. 1 and 2 show perspective cross-sectional views of a camshaft phaser for an internal combustion engine in accordance with an embodiment of the present disclosure.
Figure 2:
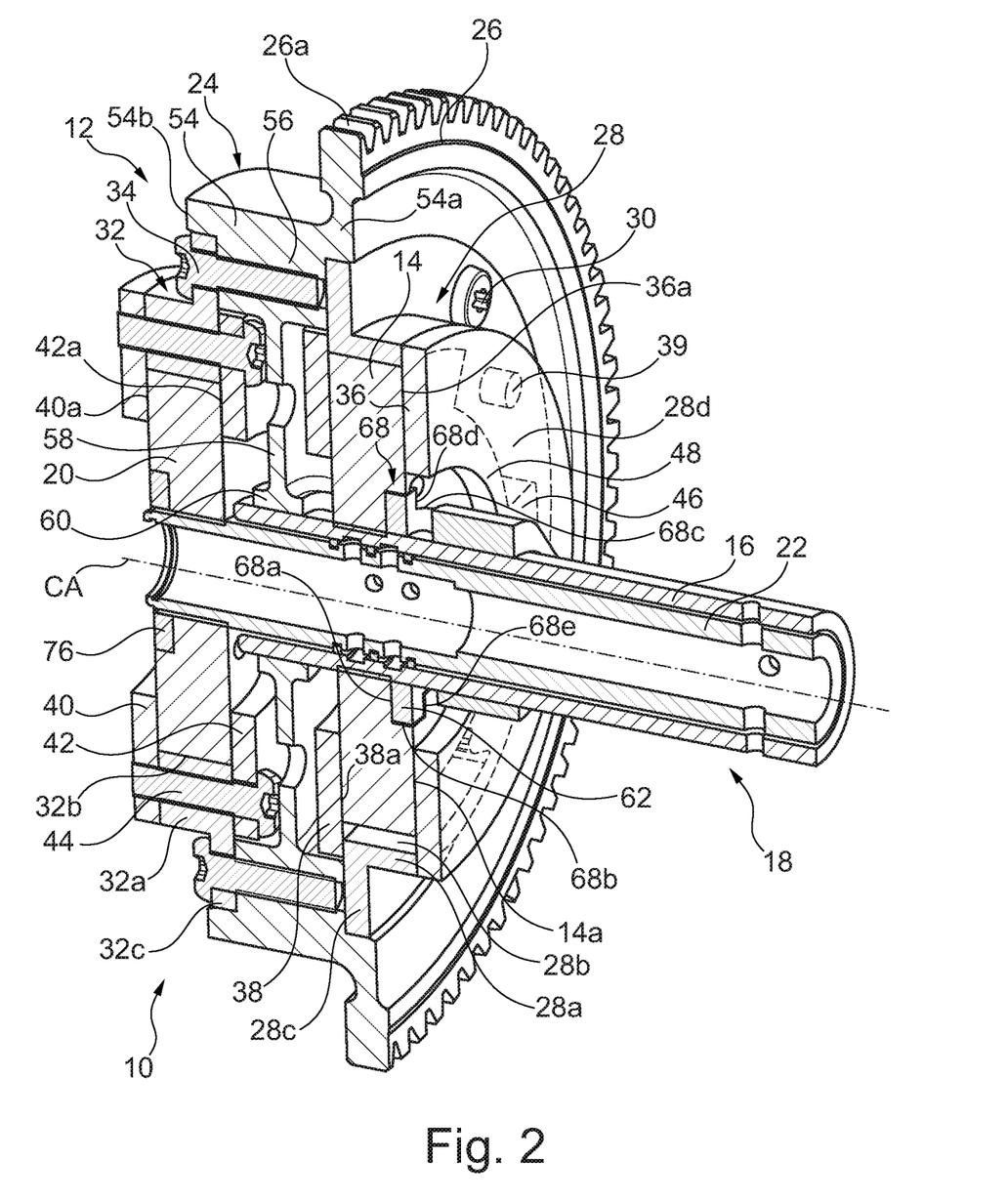
Figure 3:
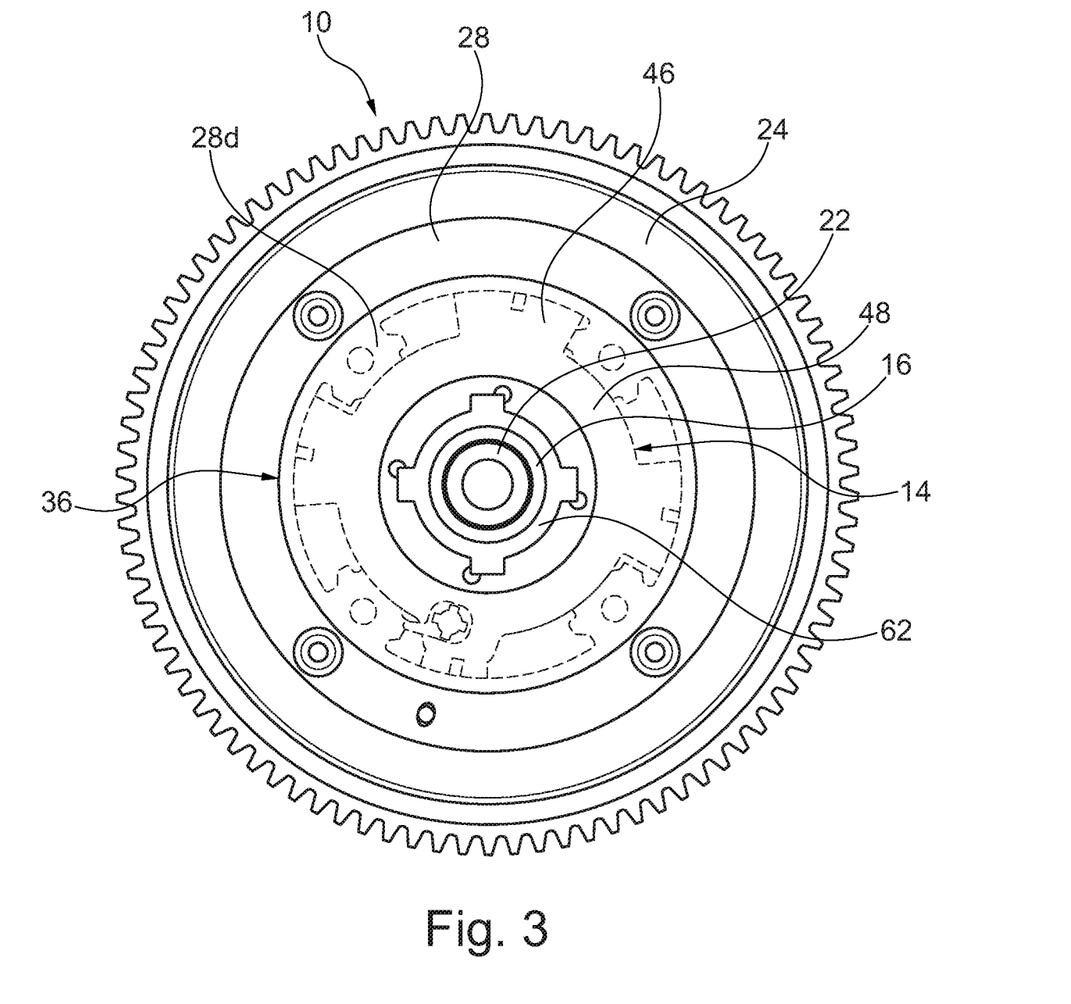
FIG. 3 shows an axial side view of the camshaft phaser shown in FIGS. 1 and 2.

FIGS. 1 and 2 show perspective cross-sectional views of a camshaft phaser 10 for an internal combustion engine in accordance with an embodiment of the present invention. FIG. 3 shows an axial side view of camshaft phaser 10. Camshaft phaser 10 includes a stator assembly 12 configured for connecting to a crankshaft of the engine and a first rotor 14 configured for non-rotatably connecting to an outer camshaft 16 of a double camshaft 18 and a second rotor 20 configured for non-rotatably connecting to an inner camshaft 22 of a double camshaft 18. First rotor 14 is rotatable with outer camshaft 16 about a center axis CA of camshaft phaser 10 and second rotor 20 is rotatable with inner camshaft 22 about center axis CA. Unless otherwise specified herein, the terms radial, axial and circumferential and derivatives thereof are used with respect to center axis CA. Stator assembly 12 includes a stator 24 having a sprocket 26, which includes plurality of circumferentially spaced teeth 26a configured for engaging with a timing chain or belt driven by the crankshaft of the engine.

Stator assembly 12 also includes a first stator section 28 nonrotatably fixed to stator 24 at a first axial side of stator 24 by a plurality of circumferentially spaced fasteners 30 and a second stator section 32 nonrotatably fixed to stator 24 at a second axial side of stator 24 by a plurality of circumferentially spaced fasteners 34. Stator assembly 12 further includes a first locking cover 36 non-rotatably fixed to first stator section 28 on a first axial side of first stator section 28 and a first plate 38 non-rotatably fixed to first stator section 28 on a first axial side of first stator section 28. First locking cover 36 and first plate 38 are fixed to first stator section 28 by a plurality of circumferentially spaced fasteners 39. Stator assembly 12 further includes a second locking cover 40 non-rotatably fixed to second stator section 32 on a first axial side of second stator section 32 and a second plate 42 non-rotatably fixed to second stator section 32 on a first axial side of second stator section 32. Second locking cover 40 and second plate 42 are fixed to second stator section 32 by a plurality of circumferentially spaced fasteners 44.

First stator section 28, first locking cover 36 and first cover plate 38 define an annular volume in which first rotor 14 is received. More specifically, first stator section 28 includes an annular section 28a having an inner circumferential surface 28b defining an outer circumference of the annular volume and a radially extending disc section 28c through which fasteners 30 axially pass. First locking cover 36 and first cover plate 38 each include a respective radially extending inner surface 36a, 38a forming axial boundaries of the annular volume. Annular section 28a includes a plurality of circumferentially spaced lobes 28d that protrude radially inward further than outermost sections of inner circumferential surface 28b. Rotor 14 includes a plurality of circumferentially spaced vanes 46 protruding radially outward from a center annular section 48 of rotor 14. Each of vanes 46 is received in a respective hydraulic working chamber formed circumferentially between two of the lobes 28d, with each hydraulic working chamber being divided into two working subchambers by the respective vane 46. First rotor 14 rotates inside of first stator section 28 through hydraulic pressure in order to vary a position of outer camshaft 16 with respect to stator assembly 12 in a known manner due to pressure differences between the two working subchambers on opposite sides of vanes 46.

Similarly, second stator section 32, second locking cover 40 and second cover plate 42 define an annular volume in which second rotor 20 is received. More specifically, second stator section 32 includes an annular section 32a having an inner circumferential surface 32b defining an outer circumference of the annular volume and a radially extending disc section 32c through which fasteners 34 axially pass. Second locking cover 40 and second cover plate 42 each include a respective radially extending inner surface 40a, 42a forming axial boundaries of the annular volume. Annular section 32a includes a plurality of circumferentially spaced lobes 32d that protrude radially inward further than outermost sections of inner circumferential surface 32b. Rotor 20 includes a plurality of circumferentially spaced vanes 50 protruding radially outward from a center annular section 52 of rotor 20. Each of vanes 50 is received in a respective hydraulic working chamber formed circumferentially between two of the lobes 32d, with each hydraulic working chamber being divided into two working subchambers by the respective vane 50. Second rotor 20 rotates inside of second stator section 32 through hydraulic pressure in order to vary a position of inner camshaft 22 with respect to stator assembly 12 in a known manner due to pressure differences between the two working subchambers on opposite sides of vanes 50.

Stator 24 includes an outer annular section 54, from which sprocket 26 protrudes radially, and an inner annular section 56, into which fasteners 34 axially extend, directly radially inward from outer annular section 54. Outer annular section 54 is axially wider than inner annular section 56 so as to include a first overhanging portion 54a that includes a first inner circumferential surface contacting an outer circumferential surface of disc section 28c and a second overhanging portion 54b that includes a first inner circumferential surface contacting an outer circumferential surface of disc section 32c. Directly radially inside of inner annular section 56, stator 24 includes a disc section 58 this is axially in between rotors 14, 20. Disc section 58 extends radially inward to merge with a hub 60 that rotatingly supports outer camshaft 16.

Camshaft adjuster 10 further includes a connector 62 configured for nonrotatably connecting rotor 14 to camshaft 16. Connector 62 is configured for being connected to an outer circumferential surface 16a of camshaft 16 via a press-fit interference. Connector 62 is also connected to rotor 14 via a press-fit interference. Connector 62 will be discussed in further detail below with respect to FIGS. 4 to 6.

Camshaft adjuster 10 may also include a connector 76 configured for nonrotatably connecting rotor 20 to camshaft 22. Connector 76 is configured for being connected to an outer circumferential surface of camshaft 22 via a press-fit interference. Connector 76 is also connected to rotor 20 via a press-fit interference. Connector 76 is configured in the same manner as connector 62 and the discussion of connector 62 below in further detail with respect to FIGS. 4 to 6 also applies to connector 76. In an alternative embodiment, rotor 20 may be non-rotatably connected to camshaft 22 via splines.

Figure 4:
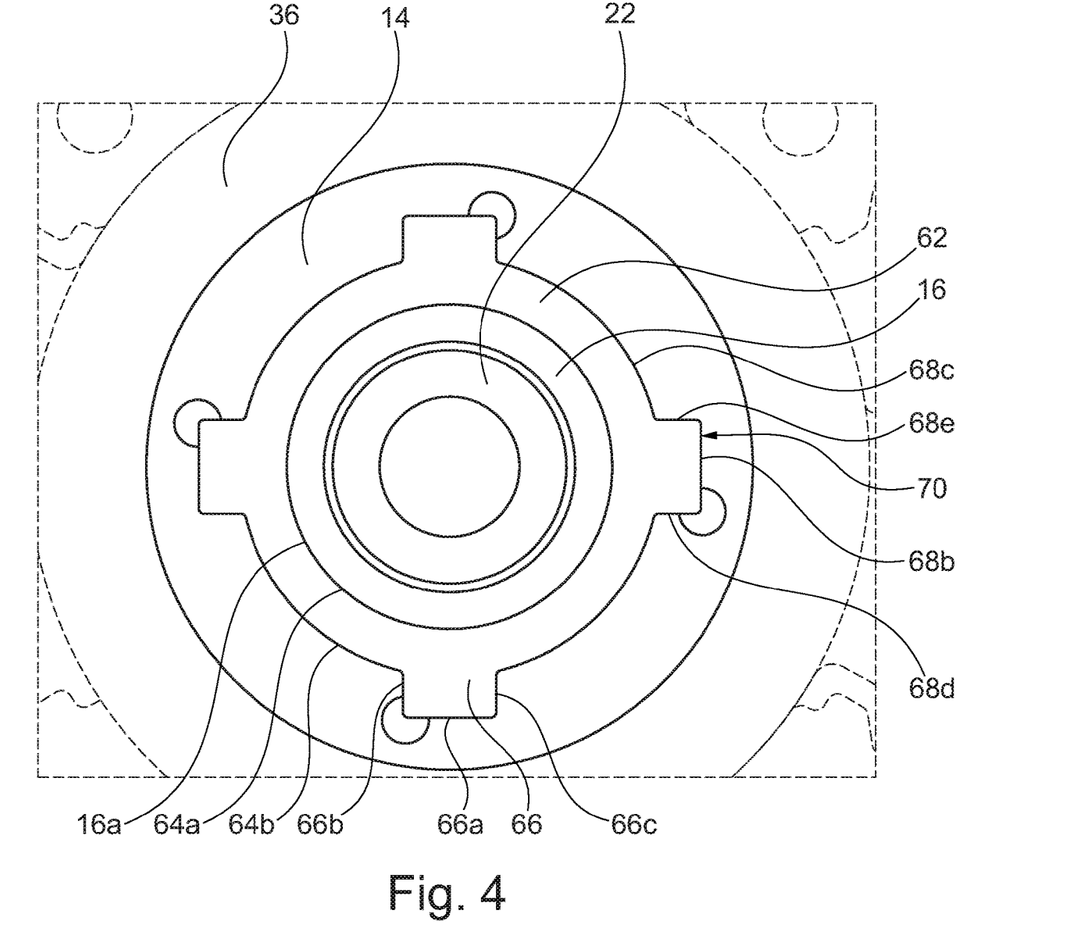
FIG. 4 shows an enlarged view of a portion of the axial view shown in FIG. 3.
Figure 5:
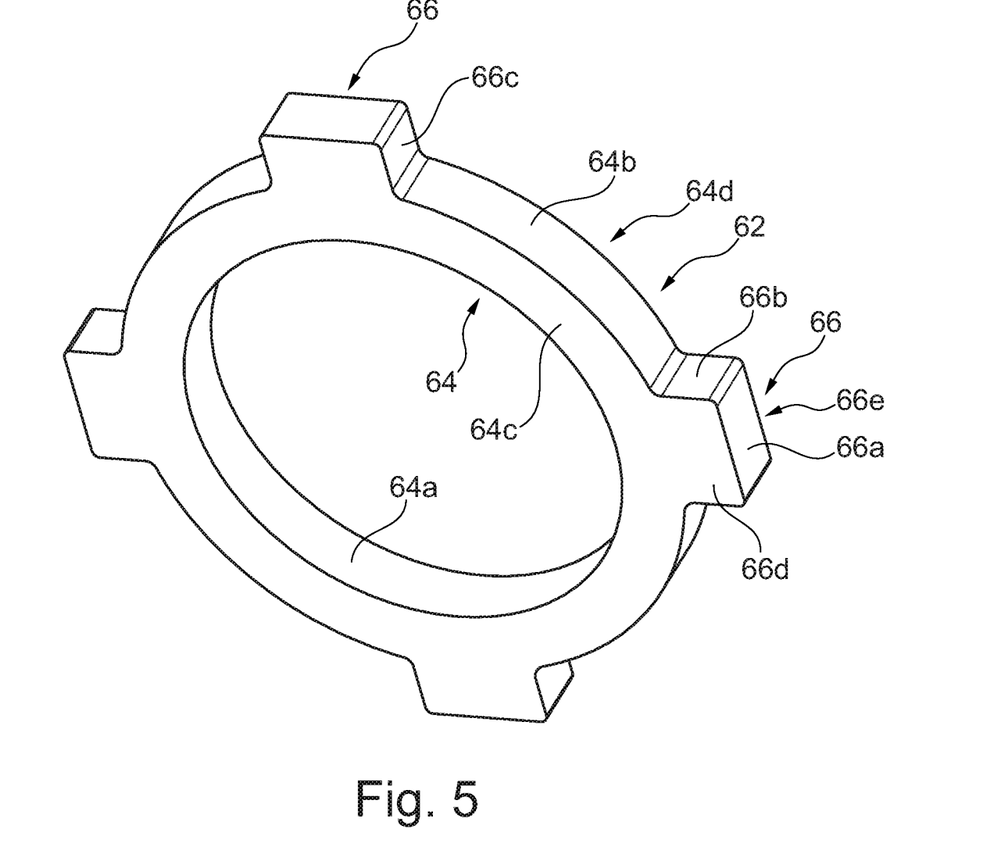
FIG. 5 shows a stand-alone perspective view of a connector of the camshaft phaser.
Figure 6:
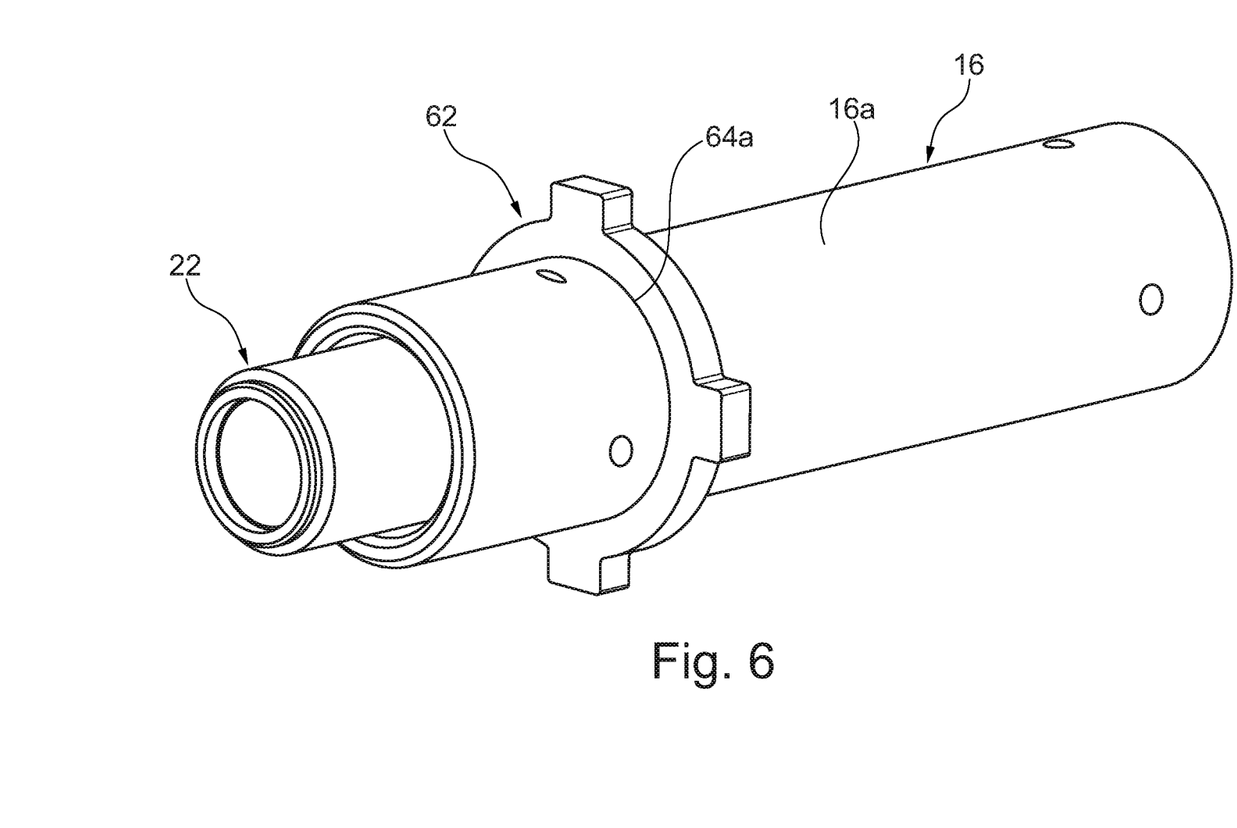
FIG. 6 shows a perspective view of the connector mounted on a camshaft.

FIG. 4 shows an enlarged view of a portion of the axial view shown in FIG. 3. FIG. 5 shows a stand-alone perspective view of connector 62. FIG. 6 shows a perspective view of connector 62 mounted on camshaft 16. Connector 62 is formed as a continuous ring including an annular base 64, which is a continuous ring, and a plurality of circumferentially spaced fixing segments 66 each protruding radially outward from annular base 64. In preferred embodiments, connector 62 is formed of metal. In particular, connector 62 may be formed of steel or powder metal.

Annular base 64 includes an inner circumferential surface 64a configured for contacting outer circumferential surface 16a to generate the press-fit interference, and an outer circumferential surface 64b from which fixing segments 66 extend radially outward. The press-fit interference is defined by tolerancing of camshaft 18 and connector 62. Inner circumferential surface 64a is smooth and does not include splines. Annular base 64 further includes a first radially extending axially facing surface 64c configured for facing rotor 14 and a second radially extending axially facing surface 64d configured for away from rotor 14. Each fixing segment 66 includes an outer circumferential surface 66a, two radially extending circumferentially facing surfaces 66b, 66c defining circumferential edges of fixing segments 66 and extending radially outward from outer circumferential surface 64b of base 64 to outer circumferential surface 66a and two radially extending axially facing surfaces 66d, 66e extending radially outward from outer circumferential surface 64b of base 64 to outer circumferential surface 66a.

To non-rotatably connect rotor 14 to camshaft 16, connector 62 is slid axially onto outer circumferential surface 16a of camshaft 16 such that connector 62 is nonrotatably fixed to outer circumferential surface 16a of camshaft 16 via press-fit interference, then rotor 14 is nonrotatably fixed to connector 62. More specifically, connector 62 is slid axially onto camshaft 16 such that connector 62 is nonrotatably fixed to connector 62 via press-fit interference. Rotor 14 includes an annular recess 68 formed in a radially extending surface 14a of rotor 14 connector 62 is slide axially onto outer circumferential surface 16a of camshaft 16 such that connector 62 is nonrotatably fixed to outer circumferential surface 16a of camshaft 16 via press-fit interference. After rotor 20 is slid onto camshaft 22, connector 76 is slid onto camshaft 22 and into rotor 20 to non-rotatably fixed rotor 20 to camshaft 22.

As shown by viewing FIGS. 2 and 4 together, annular recess 68 is defined by a radially extending surface 68a that is axially offset from radially extending surface 14a and axially extending outer circumferential surfaces 68b, 68c extending axially from radially extending surface 68a to radially extending surface 14a. Recess 68 is further defined by axially and radially extending surfaces 68d, 68e that extend axially from surface 68a to surface 14a, and that extend radially from surface the respective surface 68c to the respective surface 68b. Each of surfaces 68b is circumferentially between one of surfaces 68d and one of surfaces 68e such that surfaces 68b, 68d, 68d define a respective radially extending slot 70 configured for receiving a respective one of fixing segments 66, with each of surfaces 68b configured for contacting one of surfaces 66a, each of surfaces 68d configured for contacting one of surfaces 66b and each of surfaces 68e configured for contacting one of surfaces 66c. Radially extending surface 68a axially contacts surfaces 64c, 66d of connector 62 when connector 62 is fixed in recess 68. Each of surfaces 68c is arc shaped and is configured for directly aligning with outer circumferential surface 64b of annular base 64 of connector 62.

Rotor 14 is configured such that after rotor 14 is connected to camshaft 16 via connector 62, there is a clearance between an inner circumferential surface 14b of rotor 14 and outer circumferential surface 16a of camshaft 16, in order to provide support for the radial bearing loads transferred from the chain on teeth 26a of stator 24 to camshaft 16. Accordingly, connector 62 has a great inner diameter than rotor 14 and rotor 14 does not include splines on the inner circumferential surface 14b.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 camshaft adjuster
12 stator assembly
14 first rotor
16 outer camshaft
18 double camshaft
20 second rotor
22 inner camshaft
24 stator
26 sprocket
26a teeth
28 first stator section
28a annular section
28b inner circumferential surface
28c radially extending disc section
28d lobes
30 fasteners
32 second stator section
32a annular section
32b inner circumferential surface
32c radially extending disc section
32d lobes
34 fasteners
36 first locking cover
36a radially extending inner surface
38 first plate
38a radially extending inner surface
39 fasteners
40 second locking cover
40a radially extending inner surface
42 second plate
42a radially extending inner surface
44 fasteners
46 vanes
48 center annular section
50 vanes
52 center annular section
54 outer annular section
54a, 54b overhanging portions
56 inner annular section
58 disc section
60 hub
62 connector
64 annular base
64a inner circumferential surface
64b outer circumferential surface
64c, 64d radially extending axially facing surfaces
66 fixing segments
66a outer circumferential surface
66b, 66c radially extending circumferentially facing surfaces
66d, 66e radially extending axially facing surfaces
68 annular recess
68a radially extending surface
68b, 68c axially extending outer circumferential surfaces
68d, 68e axially and radially extending surfaces
70 slot

What is claimed is:

1. A camshaft phaser for an internal combustion engine comprising:
   a stator;
   a rotor rotatable with respect to the stator, the rotor including a recess extending axially from a radially extending surface of the rotor; and
   a connector including an annular base and at least one fixing segment protruding radially outward from the annular base; and,
   the connector configured for being nonrotatably fixed in the recess, and the connector being configured for being nonrotatably connected to an outer circumferential surface of a camshaft.

2. The camshaft phaser as recited in claim 1 wherein the recess includes at least one slot, the at least one fixing segment being configured for being fixed in the at least one slot.

3. The camshaft phaser as recited in claim 2 wherein the at least one fixing segment is a plurality of fixing segments and the at least one slot is a plurality of slots, each of the fixing segments being configured for being fixed in a respective one of the plurality of slots.

4. The camshaft phaser as recited in claim 1 wherein the connector is configured for being nonrotatably fixed to the rotor via a press-fit interference.

5. The camshaft phaser as recited in claim 4 wherein the connector is configured for being nonrotatably connected to the outer circumferential surface of the camshaft via a press-fit interference.

6. The camshaft phaser as recited in claim 1 wherein an inner diameter of the connector is greater than an inner diameter of the rotor.

7. A camshaft phaser for an internal combustion engine comprising:
   a stator;
   a first rotor rotatable with respect to the stator; and
   a connector configured for being nonrotatably fixed to the first rotor, the connector being configured for being nonrotatably connected to an outer circumferential surface of a first camshaft; and,
a second rotor configured for nonrotatably connecting to a second camshaft, the second rotor being axially offset from the first rotor and being rotatable with respect to the stator.

8. The camshaft phaser as recited in claim 7 further comprising a second connector configured for being nonrotatably fixed to the second rotor, the second connector being configured for being nonrotatably connected to an outer circumferential surface of the second camshaft.

9. A method of constructing a camshaft phaser for an internal combustion engine comprising:
providing a stator and a rotor rotatable with respect to the stator;
providing a connector configured for nonrotatably fixing to the rotor, the connector including an annular base and at least one fixing segment protruding radially outward from the annular base, the connector being configured for being nonrotatably connected to an outer circumferential surface of a camshaft; and,
fixing a recess arranged within the rotor to the connector, the recess extending axially from a radially extending surface of the rotor.

10. The method as recited in claim 9 wherein the recess includes at least one slot, and the nonrotatably fixing of the rotor to the connector including fixing the at least one fixing segment in the at least one slot.

11. The method as recited in claim 9 wherein the nonrotatably fixing of the rotor to the connector includes fixing the rotor to the connector via a press-fit interference.

12. The method as recited in claim 9 further comprising nonrotatably connecting the connector to the outer circumferential surface of the camshaft via a press-fit interference.

* * * * *